(12) United States Patent
Kijima

(10) Patent No.: US 7,804,529 B2
(45) Date of Patent: Sep. 28, 2010

(54) DIGITAL CAMERA AND TIME LAG SETTING METHOD

(75) Inventor: Takayuki Kijima, Akiruno (JP)

(73) Assignee: Eastman Kodak Company, Rochester, NY (US)

( * ) Notice: Subject to any disclaimer, the term of this patent is extended or adjusted under 35 U.S.C. 154(b) by 1072 days.

(21) Appl. No.: 11/465,132

(22) Filed: Aug. 17, 2006

(65) Prior Publication Data

US 2008/0198243 A1 Aug. 21, 2008

(30) Foreign Application Priority Data

Oct. 7, 2005 (JP) ............... 2005-294523

(51) Int. Cl.
*H04N 5/76* (2006.01)
(52) U.S. Cl. ............... 348/231.99; 348/231.6
(58) Field of Classification Search . 348/231.99–231.6; 382/305–306
See application file for complete search history.

(56) References Cited

U.S. PATENT DOCUMENTS

| | | | | |
|---|---|---|---|---|
| 5,870,754 | A * | 2/1999 | Dimitrova et al. ........... | 1/1 |
| 6,587,637 | B2 * | 7/2003 | Nagasaka et al. .......... | 386/69 |
| 6,822,683 | B1 * | 11/2004 | Torikai ................. | 348/333.13 |
| 6,847,388 | B2 * | 1/2005 | Anderson ............... | 715/854 |
| 7,006,140 | B2 | 2/2006 | Shono | |
| 7,181,127 | B2 * | 2/2007 | Nagasaka et al. ........... | 386/69 |
| 7,233,684 | B2 * | 6/2007 | Fedorovskaya et al. ..... | 382/118 |
| 2001/0028394 | A1 * | 10/2001 | Matsumoto et al. ......... | 348/207 |
| 2003/0189647 | A1 * | 10/2003 | Kang .................... | 348/207.99 |
| 2004/0169767 | A1 * | 9/2004 | Norita et al. ............ | 348/350 |

FOREIGN PATENT DOCUMENTS

| | | |
|---|---|---|
| JP | 2002-006208 | 1/2002 |
| JP | 2002-271673 | 9/2002 |

\* cited by examiner

*Primary Examiner*—Jason Chan
*Assistant Examiner*—Pritham Prabhakher
(74) *Attorney, Agent, or Firm*—Pamela R. Crocker; Peyton C. Watkins

(57) ABSTRACT

A digital camera records, as image data for storage in storage memory, image data captured a preset time lag period before image data captured at the time of receipt of a capture instruction among a plurality of frames of image data consecutively output by an image sensor until receipt of the capture instruction. A time lag period setting section displays at least one frame of image data stored in a ring buffer to thus receive, from the user, an instruction for selecting image data captured at a user's intended capture timing; computes a period from which the image data specified by the selection instruction are recorded in the temporary storage memory until when image data captured at the time of receipt of the capture instruction are recorded in the temporary storage memory; and registers the computed period as the time lag period in the time lag period storage section.

16 Claims, 8 Drawing Sheets

DIGITAL CAMERA AND TIME LAG SETTING METHOD

CROSS-REFERENCE TO RELATED APPLICATION

The disclosure of Japanese Patent Application No. 2005-294523 including the specification, claims, drawings and abstract is incorporated herein by reference in its entirety.

BACKGROUND OF THE INVENTION

1. Field of the Invention

The present invention relates to a digital camera, and more particularly to a digital camera for recording, in storage memory as image data for storage purpose (hereinafter called "storage image data"), image data—preceding, by a predetermined time lag period, image data acquired at the time of receipt of a capture instruction—among a plurality of items of image data consecutively output by an image sensor until the photographing command is received.

2. Related Art

When the user has perceived a moment, which the user desires to photograph, and has depressed a shutter switch of a camera, a time lag arises from when an object is actually, visually perceived until the shutter button is depressed, and another time lag corresponding to the amount of time required by the camera to capture an image also occurs. There may arise a case where an image of the moment, which the user has desired to photograph, cannot be recorded, because of these time lags.

For these reasons, Japanese Patent Laid-Open Publication 2002-271673 describes the following digital camera. The digital camera is provided with a time lag measurement mode, and a time (time lag) $T_1$—from when the user has made visual perception until when the shutter switch is depressed—has been measured in advance. When having completed preparations for photographing, such as AE (Automatic Exposure)/AF (Automatic Focus) processing, the digital camera starts capturing image data without awaiting depression of the shutter switch. The digital camera sequentially stores the thus-captured image data into memory for temporary recording purpose, thereby retaining image data for at least a period of $T_1$. When the user has depressed the shutter switch, the digital camera selects the image data, which go back only a time $T_1$ from when the shutter switch is depressed, as image data for storage purpose. The thus-selected image data are stored in recording memory. The digital camera illuminates an LED, thereby measuring a time which elapses before depression of the shutter switch. Thus, the time lag is measured.

However, the time lag varies depending on a state of the user's mind or according to the type of a subject. Therefore, even when the image data, which go back a previously-measured time lag, have been selected, the image data are not always desired image data for the user.

The present invention provides a digital camera which lessens the influence of a time lag and which enables recording of image data at desired photographing timing.

SUMMARY OF THE INVENTION

The present invention provides a digital camera for recording, as image data for storage purpose in storage memory, image data captured a preset time lag period before image data captured at the time of receipt of a capture instruction among a plurality of frames of image data consecutively output by an image sensor until receipt of the capture instruction, the digital camera comprising:

temporary storage memory for sequentially storing image data which are consecutively output from the image sensor until receipt of the capture instruction; and a time lag period setting section which displays at least a frame of image data stored in the temporary storage memory to thus receive, from the user, an instruction for selecting image data captured at a user's intended capture timing; computes a period from when the image data specified by the selection instruction are recorded in the temporary storage memory until when image data captured at the time of receipt of the capture instruction are recorded in the temporary storage memory; and sets the computed period as the time lag period.

According to one mode of the present invention, the digital camera further comprises:

a thumbnail image generation section which reduces a data size of the image data output from the image sensor, to thus generate thumbnail image data. The temporary storage memory sequentially stores respective frames of thumbnail image data in association with respective frames of the image data output from the image sensor. Further, the time lag period setting section displays at least one frame of thumbnail image data stored in the temporary storage memory, receives an instruction for selecting a frame of thumbnail image data corresponding to the image data captured at a user's intended capture timing, computes a period from when the image data corresponding to the frame of thumbnail image data specified by the selection instruction are recorded in the temporary storage memory until when the image data captured at the time of receipt of the capture instruction are recorded in the temporary storage memory, and sets the time lag period on the basis of the computed period.

According to the present invention, a digital camera enables setting of a time lag period so that image data captured at user's intended capture timing can be recorded in storage memory.

The invention will be more clearly comprehended by reference to the embodiments provided below. However, the scope of the invention is not limited to the embodiments.

BRIEF DESCRIPTION OF THE DRAWINGS

Preferred embodiments of the present invention will be described in detail by reference to the following figures, wherein.

DETAILED DESCRIPTION OF THE PREFERRED EMBODIMENTS

A best mode (hereinafter called an "embodiment") for implementing the present invention will be described hereinbelow by reference to the drawings.

Figure 1:
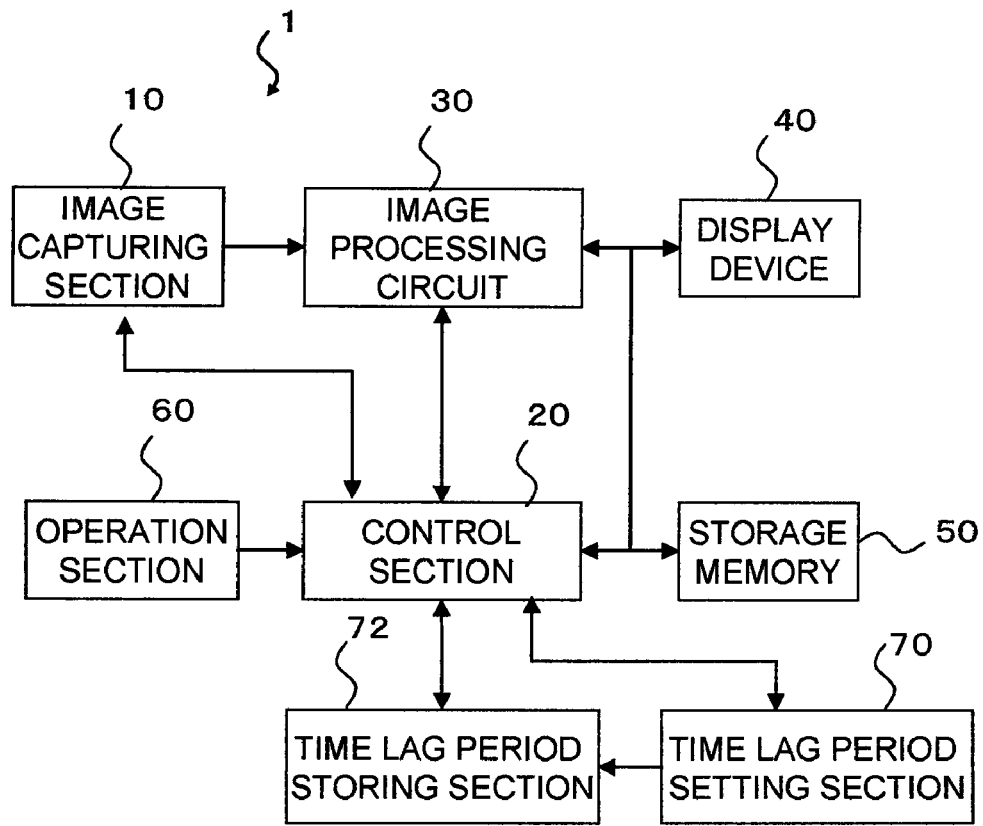
FIG. 1 is a view showing functional blocks of a digital camera according to an embodiment of the present invention and a modification thereof.

FIG. 1 is a view showing functional blocks of a digital camera 1 according to an embodiment. An image-capturing section 10 has an image sensor such as a CCD (Charge-Coupled Device) or a CMOS (Complementary Metal Oxide Semiconductor). Under control of a control section 20, the image-capturing section 10 converts an analog signal output from an image sensor into a digital signal; converts an optical image of a subject into image data such as RAW data; and outputs the thus-converted image data. In the present embodiment, the image-capturing section 10 starts outputting image data when a shutter button is pressed halfway down, and keeps outputting the image data at given intervals until the shutter button is pressed all the way down. In short, from when the shutter button is pressed halfway down until when the shutter button is pressed all the way down, the image-capturing section 10 consecutively converts optical images of a subject at given intervals into image data and sequentially outputs the thus-converted image data.

The control section 20 is a central processor for controlling the entire camera 1, and performs arithmetic operation and control operation for respective circuits or the like. An image-processing circuit 30 subjects image data; i.e., RAW data output from the image-capturing section 10, to predetermined image processing, to thus convert the image data of RAW data into image data for display purpose (hereinafter called "display image data") or storage image data and output the thus-converted data. A display device 40 sequentially displays images based on the display image data, thereby acting as a viewfinder for photographing purpose. Memory 50 for storage purpose (hereinafter called "storage memory") records the storage image data. An operation section 60 includes a shutter button, and the like, and acts as a user interface used for operating the camera 1 when the user photographs a still image or a motion image by use of the camera 1.

A time lag period setting section 70 computes a time lag period which is a time difference between the photographing timing intended by the user and the timing when the shutter button is actually pressed all the way down, and registers the thus-computed time lag period into a time lag period storage section 72.

Of the image data consecutively output by the image-capturing section 10, image data captured at the photographing timing intended by the user are selected as a candidate for storage by the control section 20 on the basis of the time lag period registered in the time lag period storage section 72. Further, the image-capturing section 10 causes the image-processing circuit 30 to subject the image data, selected as a candidate for storage, to image processing, and storage image data output from the image-processing circuit 30 are recorded in the storage memory 50.

Figure 2:
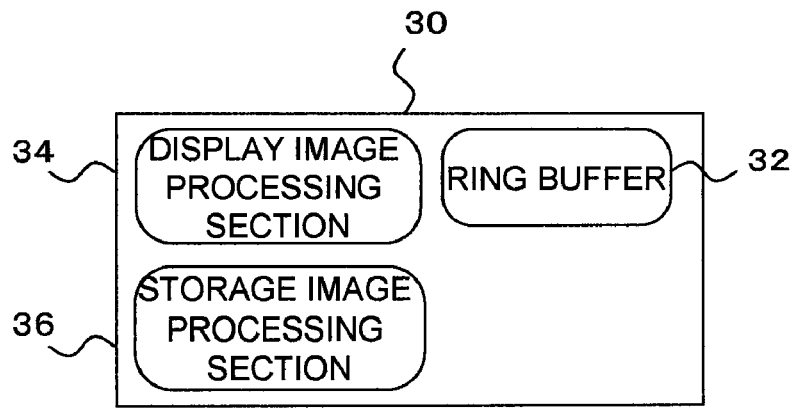
FIG. 2 is a view showing functional blocks of an image processing circuit of the embodiment.

FIG. 2 is a view showing more detailed functional blocks of the image-processing circuit 30. In FIG. 2, a ring buffer 32 is temporary retention memory where memory areas formed from a plurality of data buffers are logically arranged into the shape of a ring. The image data of RAW data consecutively output from the image-capturing section 10 are stored in the ring buffer 32 in chronological sequence. When the capacity of the ring buffer 32 for storing image data has become deficient, the ring buffer deletes the image data recorded in the past in order of occurrence and records new image data. A display image processing section 34 converts the image data output from the image-capturing section 10 into low-resolution image data, and subjects the low-resolution image data to predetermined image processing for displaying the image on a screen, thereby generating display image data. Moreover, the display image processing section 34 also subjects the image data stored in the ring buffer 32 to predetermined image processing for displaying an image, thereby generating image data for display purpose. A storage image processing section 36 subjects, to image processing such as white balance adjustment or the like, image data—preceding, by a preset time lag period, the image data acquired when the shutter button has been depressed all the way down—among the image data stored in the ring buffer 32, thereby generating storage image data. The thus-generated image storage data are recorded in the storage memory 50.

Figure 3:
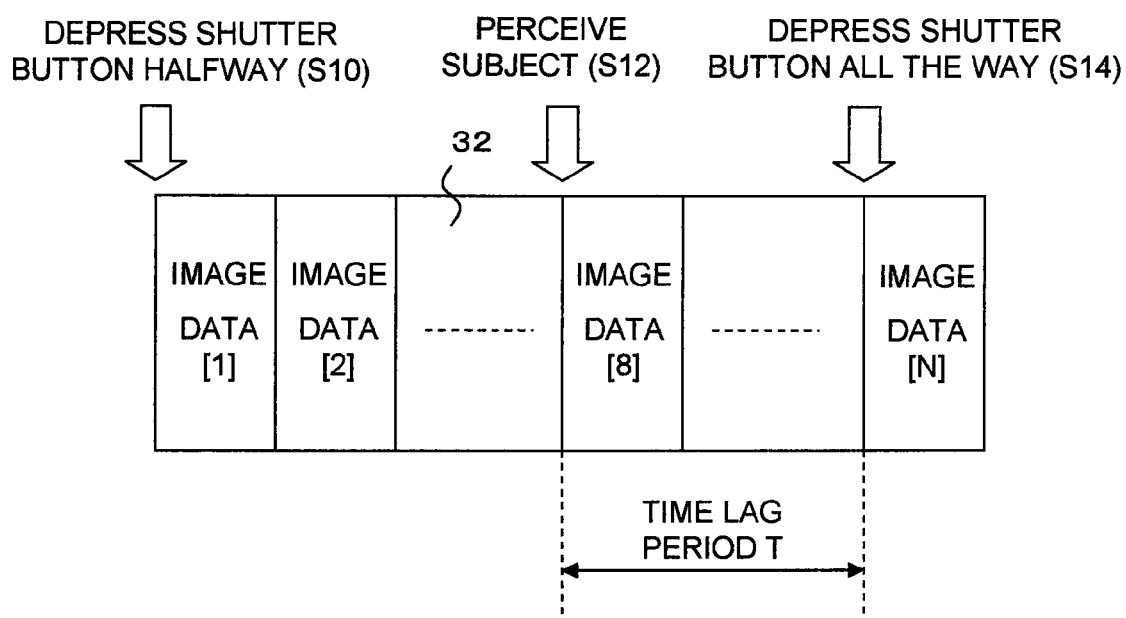
FIG. 3 is a conceptual rendering of a ring buffer.

FIG. 3 is a conceptual rendering of the ring buffer 32. The image data [n] signify image data recorded in the $n^{th}$ ring buffer 32.

As illustrated in FIG. 3, when the user has depressed the shutter button halfway down (S10), the ring buffer 32 sequentially records the image data in chronological sequence. After having perceived a subject and determined the current moment as a photographing timing (S12), the user depresses the shutter button all the way down (S14), and the image data acquired when the shutter button has been pressed all the way down are recorded in the ring buffer 32, whereupon an output of image data is completed. As mentioned above, a time lag exists from when the user has perceived the subject and determined the current moment as a photographing timing until when the user actually presses the shutter button all the way down. For this reason, there sometimes arises a case where the image data captured when the user has determined the current moment as a photographing timing differ from the image data captured when the shutter button is actually pressed all the way down in terms of the captured state of the subject. Accordingly, the camera 1 of the present embodiment selects, as a candidate for storage, the image data recorded a preset time lag period before the image data—having been captured when the shutter button has been pressed all the way down—are recorded in the ring buffer 32. Thereby, even when the time lag has arisen in the camera 1, the user can record the image data acquired at the user's intended photographing timing into the storage memory as storage image data.

However, the time lag period often varies from, e.g., a case where a motorsports event is photographed to, e.g., a case where impacting action of golf swing is photographed. Since user's visual reaction speed varies according to the brightness level of the photographic scene, there may arise a case where the time lag period varies according to the brightness level of the photographic scene. In the present embodiment, even when the photographic scene is changed, the camera 1 corrects a time lag period so that the image data captured at the user's intended photographing timing can be recorded into the storage memory.

Figure 4:
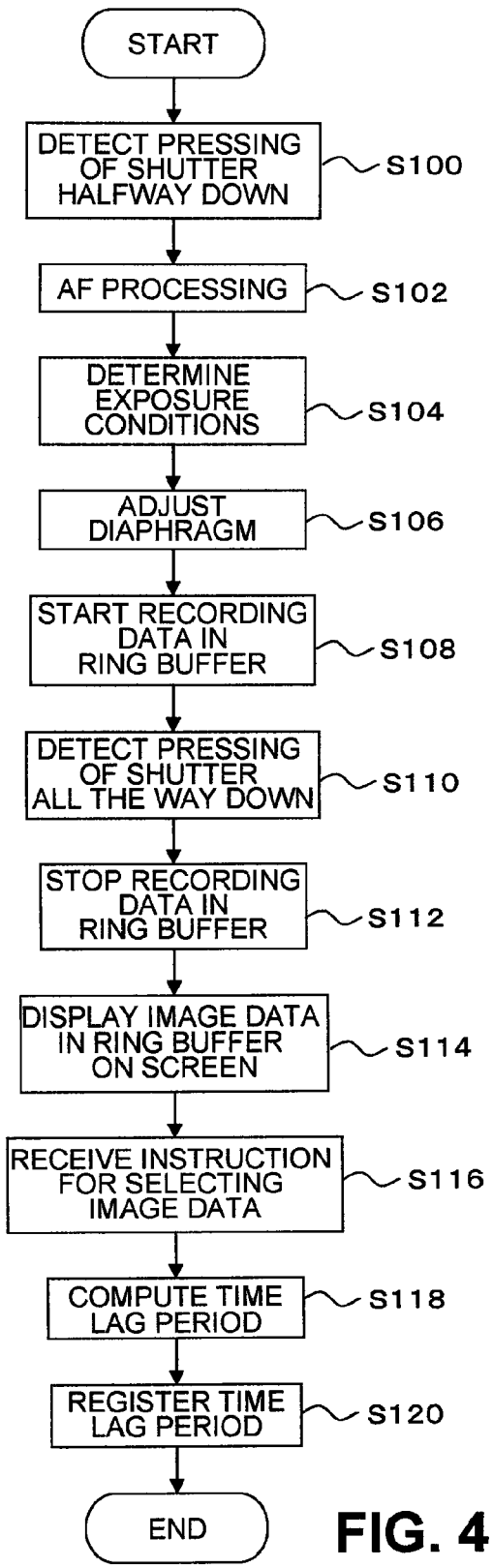
FIG. 4 is a flowchart showing operation procedures performed when the camera of the embodiment sets a time lag period.

Operation of the camera 1 of the present embodiment will be described hereunder. FIG. 4 is a flowchart showing operation procedures employed when the camera 1 of the present embodiment sets a time lag period.

The camera 1 can operate in a "time lag setting mode," and the user sets the camera 1 to the time lag setting mode by way of the operation section 60. When setting of the time lag setting mode has been completed, the user operates the camera 1 to thus push the shutter button halfway down to thus enter a standby condition. When having perceived intended photographing timing, the user pushes the shutter button all the way down. Subsequently, the user operates the camera 1 to thus retrieve image data at the intended photographing timing. Thereby, the camera 1 sets a time lag period.

By reference to FIG. 4, operation procedures of the camera 1 employed at the time of setting of a time lag will now be described. First, when having detected halfway pressing of the shutter button (S100), the camera 1 performs AF processing (S102), determines exposure conditions (S104), and adjusts a diaphragm (S106). Next, the camera 1 starts causing the image-capturing section 10 to output image data, and starts causing the ring buffer 32 to record the image data (S108). Subsequently, upon detection of pressing of the shutter button all the way down (S110), the camera 1 stops the image-capturing section 10 to output the image data, and stops the ring buffer 32 to record the image data (S112).

Figure 5A:
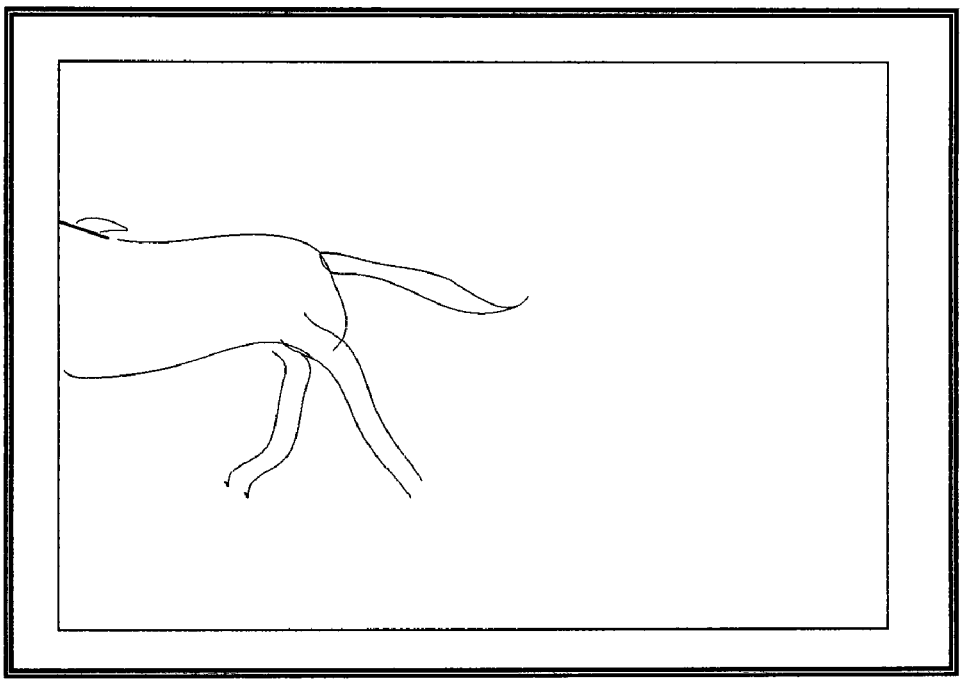
FIG. 5A shows example image data displayed on a screen.
Figure 5B:
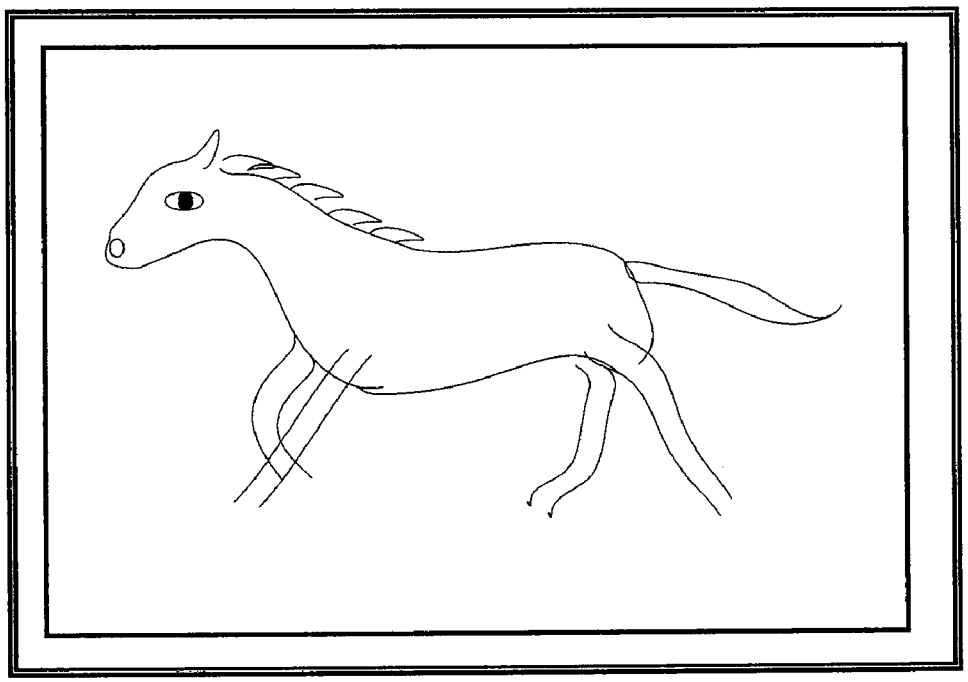
FIG. 5B shows example image data displayed on the screen.

Next, the camera 1 converts the image data recorded in the ring buffer 32 into display image data, and displays the image data on a screen of the display device 40 (S114). The camera 1 displays on the screen, for example, the image data corresponding to the time lag period set as a default value in the time lag period storage section 72. When the user has determined that the image data displayed on the screen are not photographed at the desired photographing timing, the image data recorded in the ring buffer 32 before and after the image data appearing on the screen are sequentially displayed on the screen by way of the operation section 60, thereby searching image data captured at the intended photographing timing. When the desired image data have been successfully searched, the user issues a selection instruction specifying the image data by way of the operation section 60. For instance, as shown in FIG. 5A, when the image appearing on the screen is not the image captured at desired photographing timing, the user searches and selects an image captured at desired photographing timing such as that shown in FIG. 5B.

Upon receipt of the selection instruction from the user by way of the operation section 60 (S116), the camera 1 specifies a memory area in the ring buffer 32 where the image data specified by the selection instruction are recorded, thereby computing the time lag period T (S118). For instance, provided that an interval at which image data are recorded into the ring buffer 32 is set to "$t_o$," image data captured when the shutter button has been pressed all the way down are taken as image data [N], and the image data specified by the selection instruction are taken as image data [M], the time lag period T can be computed by the following expression (1).

$$T = t_o \times (N - M) \quad (1)$$

When the time lag period T has been computed, the camera 1 registers the time lag period T into the time lag period storage section 72 (S120).

As above, according to the present embodiment, the digital camera enables setting of a time lag period so that the image data captured at the user's intended photographing timing can be recorded into the storage memory. Consequently, even when a photographing scene is changed, the image data captured at the user's intended photographing timing can be recorded in the storage memory.

Subsequently, a modification of the embodiment will be described. The modification differs from the embodiment in that the image size of the image data output from the image-capturing section 10 is reduced, to thus generate thumbnail image data, and that the thumbnail image data are recorded in the ring buffer 32 in association with the image data.

The present embodiment has described a case where, when the image data captured at the user's intended photographing timing are searched, the image data of RAW data recorded in the ring buffer 32 are sequentially converted into display image data, and the display image data are displayed on the screen. However, image processing performed for converting the image data of RAW data into display image data involves consumption of a certain amount of time, and a certain amount of time elapses before the image data are displayed on the screen. In addition, displaying several frames of image data on the screen makes it easy for the user to select image data captured at desired photographing timing. Further, full-size image data are not necessary purely for selection of image data captured at the desired photographing timing, and the user can select the image data even from frames of image data of certain small size.

Figure 6:
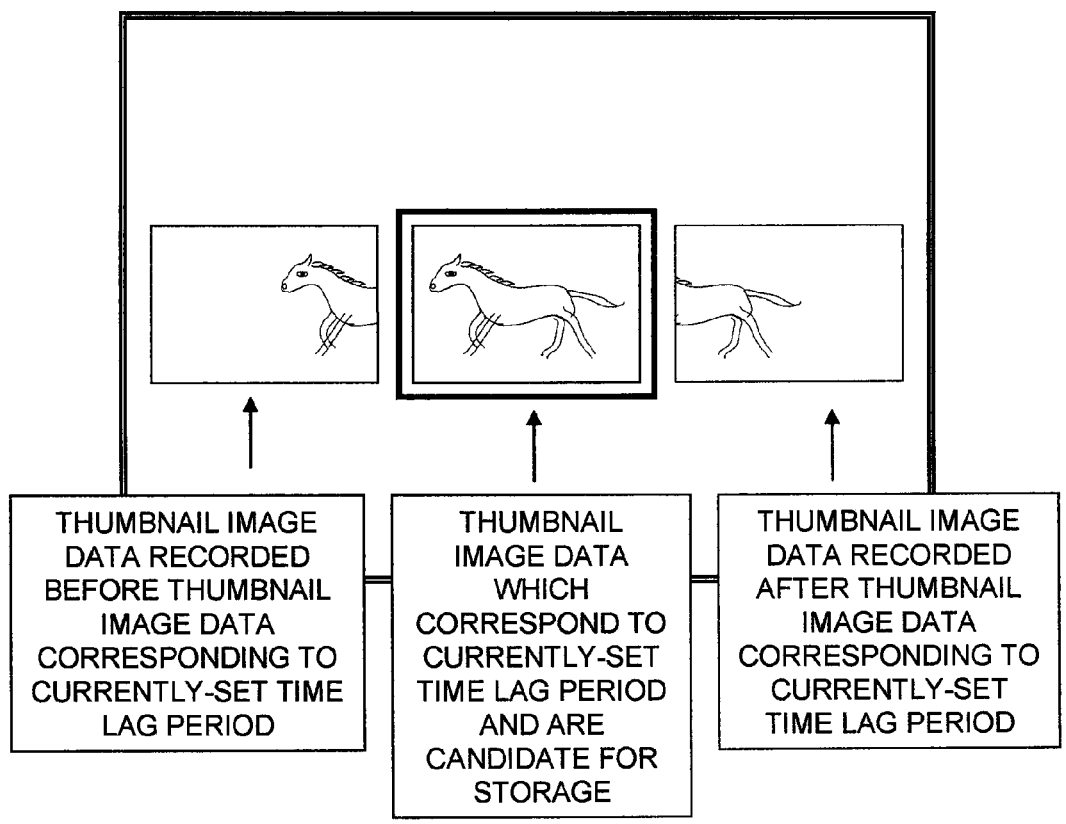
FIG. 6 is a view showing example thumbnail image data displayed on the screen.

In the modification, the image size of the image data output from the image-capturing section 10 is reduced, to thus generate thumbnail image data, and the thumbnail image data are recorded in the ring buffer 32 in association with the image data of RAW data. When the camera 1 causes the user to select the image data captured at desired photographing timing, all of the frames of thumbnail image data recorded in the ring buffer 32 are displayed in the form of a list. Alternatively, thumbnail image data corresponding to a preset time lag period and several frames of thumbnail image data recorded in the ring buffer 32 before and after that thumbnail image data are displayed side by side. FIG. 6 is a conceptual rendering of a screen on which the thumbnail image data corresponding to the currently-set time lag period and the thumbnail image data recorded in the ring buffer 32 before and after that thumbnail image data are displayed.

Figure 7:
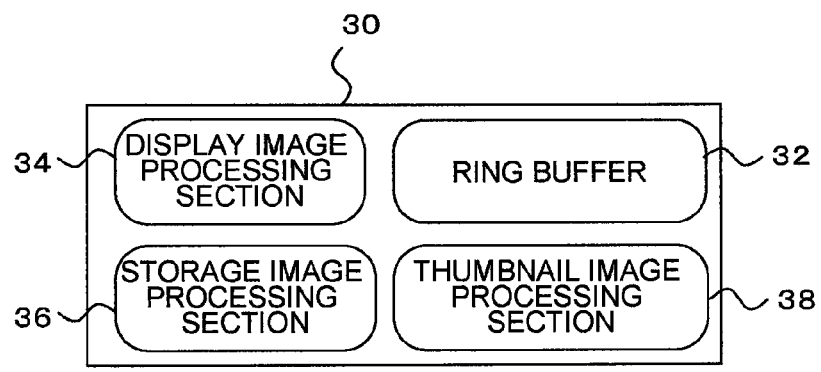
FIG. 7 is a view showing functional blocks in the image processing circuit of the modification.

FIG. 7 is a view showing functional blocks of the image-processing circuit 30 of the modification. The image-processing circuit 30 of the modification differs from its counterpart of the embodiment in that the image-processing circuit 30 of the modification has a thumbnail-image-processing section 38.

Figure 8:
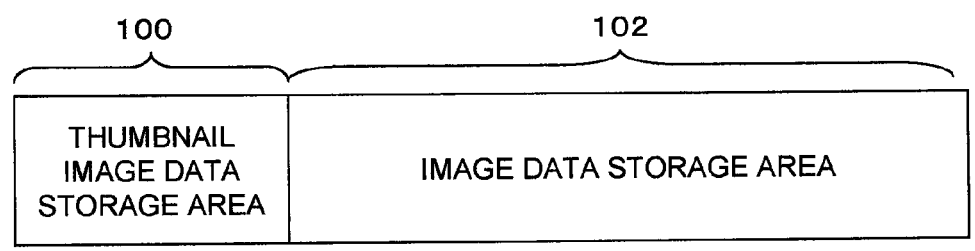
FIG. 8 is a view showing the configuration of a storage area of a ring buffer.

As mentioned above, the thumbnail-image-processing section 38 generates thumbnail image data into which the image size of the image data output from the image-capturing section 10 is reduced, and records the thus-generated thumbnail image data in the ring buffer 32 in association with the corresponding image data. FIG. 8 is a conceptual rendering of the memory area of the ring buffer 32 of the modification. As shown in FIG. 8, the ring buffer 32 of the modification is formed from a thumbnail image data storage area 100 and an image data storage area 102. The respective areas are formed into the shape of a logical ring.

Figure 9:
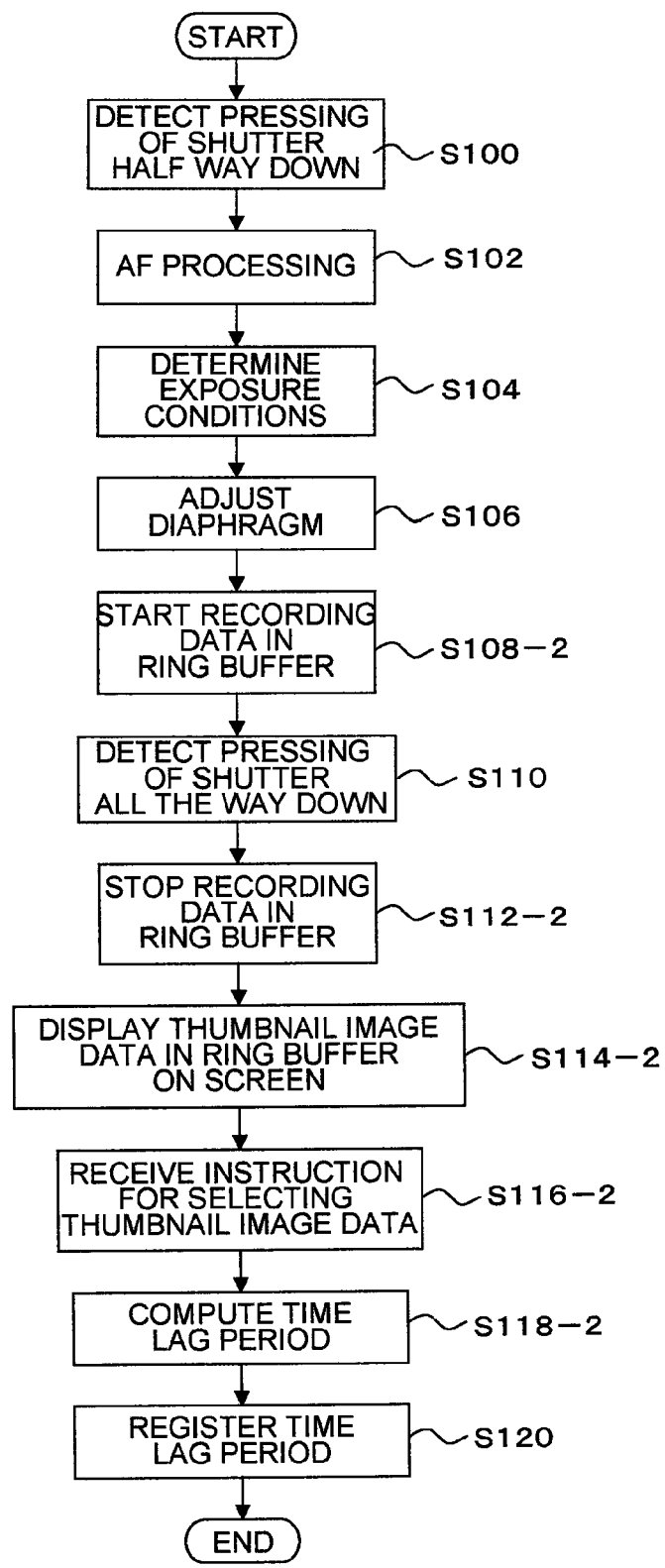
FIG. 9 is a flowchart showing operation procedures performed when the camera of the modification sets a time lag period.
Figure 10:
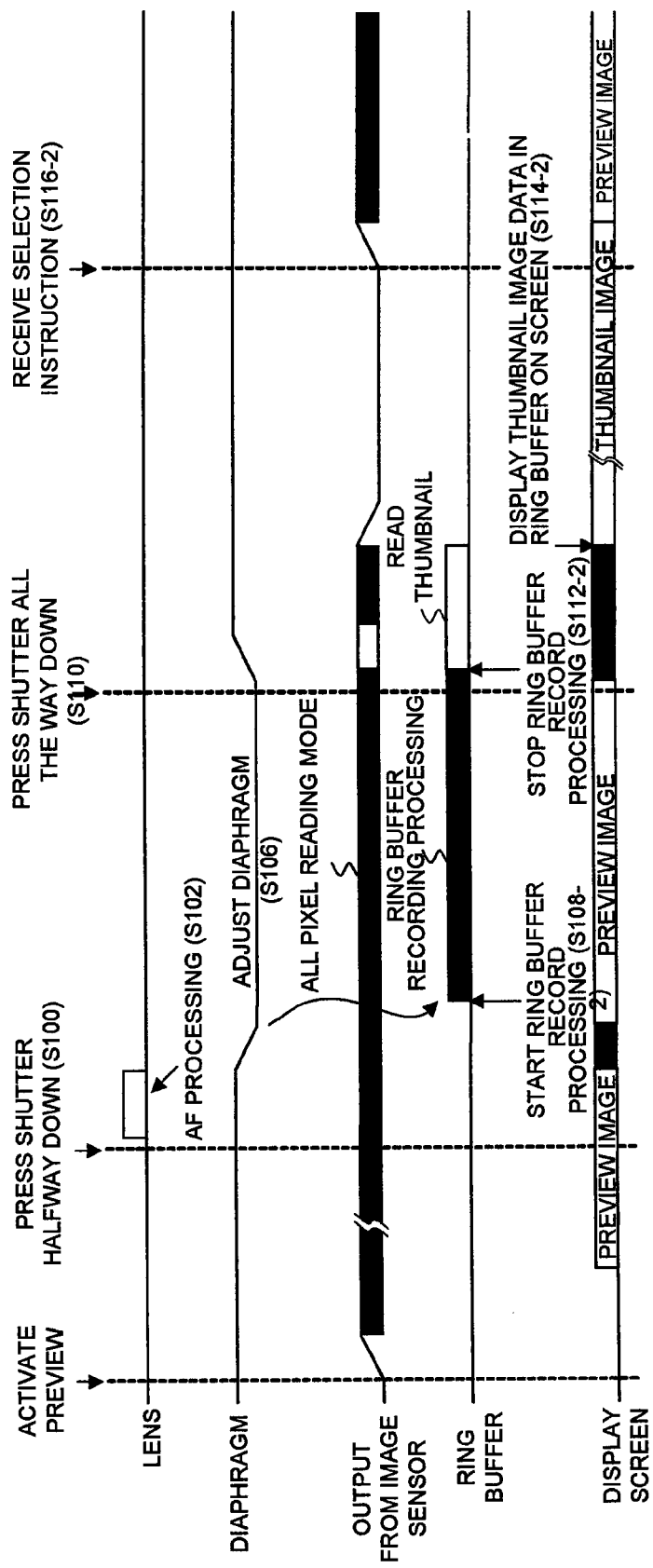
FIG. 10 is a timing chart showing operation timings of a lens, a diaphragm, an image sensor, a ring buffer, and a display device achieved when the camera of the modification sets a time lag period.

FIG. 9 is a flowchart showing operation procedures performed when the camera 1 of the modification sets a time lag period. In FIG. 9, those processing steps which are the same as the processing steps of the flowchart shown in FIG. 4 are assigned the same reference numerals, and their explanations are omitted. FIG. 10 is a timing chart showing operation timings of the lens, the diaphragm, the image sensor, the ring buffer, and the display device of the camera 1, in association with FIG. 9. Operation procedures employed when the camera 1 sets the time lag period will be described by reference to FIGS. 9 and 10.

When having detected pressing of the shutter button halfway down (S100) and completed adjustment of the diaphragm (S106), the camera 1 generates the thumbnail image data of the image data output from the image capturing section 10 and starts processing for recording the image data into the ring buffer 32 in association with the thumbnail image data (S108-2). Subsequently, upon detection of pressing of the shutter button all the way down, the camera 1 stops processing for recording image data into the ring buffer 32, and displays the thumbnail image data recorded in the ring buffer 32 on the screen (S114-2). The manner of displaying image data on the screen is as mentioned previously. The camera 1 receives, from the user, the selection instruction specifying the thumbnail image data captured at desired photographing timing by way of the operation section 60 (S116-2). Further, the camera 1 specifies the storage area of the image data corresponding to the thumbnail image data specified by the selection instruction from the image data recorded in the ring buffer 32, thereby computes the time lag period T (S118-2), and registers the computed time lag period T as a time lag period T in the time lag period storage section 72 (S120).

In the modification, the image data consecutively output from the image-capturing section 10 from when the shutter button is pressed halfway down until when the shutter button is pressed all the way down and the thumbnail image data of the image data are sequentially recorded in the ring buffer 32 in an associated manner. The camera 1 displays on the screen the thumbnail image data recorded in the ring buffer 32; and receives, from the user, an instruction for selecting the thumbnail image data captured at the desired photographing timing. Thus, as a result of thumbnail image data having been generated and recorded in the ring buffer 32 in advance, the time required to display a list of frames of image data and display a plurality of images side by side can be shortened.

The embodiment and the modification have described an example where the camera 1 set in the time lag setting mode sets only the time lag period in accordance with the selection instruction. However, concurrently with setting of the time lag period, the camera 1 may record the image data specified by the selection instruction as storage image data in the storage memory 50. In this case, for instance, upon detection of pressing of the shutter button all the way down, the camera 1 temporarily records the image data selected on the basis of the preset time lag period into the storage memory 50 as storage image data. Subsequently, the camera 1 displays the image data or the thumbnail image data recorded in the ring buffer 32 on the screen, and receives the selection instruction from the user. When the image data corresponding to the received selection instruction are different from the image data recorded in the storage memory 50, the camera 1 changes the period of the time lag and the storage image data. In this case, before storing the image data into the storage memory 50, the camera 1 may display the image data or the thumbnail image data recorded in the ring buffer 32, to thus cause the user to select an image captured at desired photographing timing.

Moreover, the camera 1 may store the time lag period computed every time it receives a selection instruction from the user, and may select an average of a plurality of time lag periods or the time lag period selected with the highest frequency and register the thus-selected average or time lag period into the time lag period storage section 72.

Moreover, in a case where the camera 1 is of a type which also doubles as an optical finder as well as an electronic viewfinder, the time lag period changes from a case where the electronic viewfinder is used to a case where the optical finder is used. Consequently, the camera 1 may separately register, in the time lag period storage section 72, the time lag used for the case where the electronic view finder is used and the time lag used for the case where the optical finder is used; and may change the time lag period to be referred to in accordance with the type of the finder used.

PARTS LIST

10 Image capturing section
20 Control section
30 Image processing circuit
32 Ring buffer
34 Display image processing section
36 Storage image processing section
38 Thumbnail image processing section
40 Display device
50 Storage memory
60 Operation section
70 Time lag period setting section
72 Time lag period storage section
100 Thumbnail image data storage area
102 Image data storage area
S10 Depress shutter button halfway
S12 Perceive subject
S14 Depress shutter button all the way
S100 Detect pressing of shutter halfway down
S102 AF processing
S104 Determining exposure condition
S106 Adjust diaphragm
S108, S108-2 Start recording data in ring buffer
S110 Detect pressing of shutter all the way down
S112, S112-2 Stop recoding data in ring buffer
S114 Display image data in ring buffer on screen
S114-2 Display thumbnail image data in ring buffer on screen
S116 Receive instruction for selecting image data
S116-2 Receive instruction for selecting thumbnail image data
S118, S118-2 Compute time lag period
S120 Register time lag period

What is claimed is:

1. A digital camera comprising;
(a) a user interface for receiving an image capture instruction;
(b) a temporary storage memory for sequentially storing image data which are consecutively output from an image sensor from a time $T_1$ prior to the receipt of the image capture instruction until a time T of the image capture instruction;
(c) a display device for displaying at least one of the temporarily stored image data between time T and $T_1$;
(d) a time lag period setting section that receives instructions selecting an intended image captured at a time $T_2$ from the plurality of temporarily stored image data stored between time T and $T_1$ and that calculates time between T to $T_2$ as a time lag period which is registered as the time lag period of the camera; and
(e) a control mechanism which automatically selects for storage an image captured the set time lag period before time T.

2. The digital camera as in claim 1, wherein time $T_2$ is different from time T.

3. The digital camera as in claim 2, wherein time $T_2$ is different from time $T_1$.

4. The digital camera as in claim 1, wherein a plurality of images are stored as candidate images.

5. The digital camera as in claim 1, wherein the display displays thumbnail images.

6. The digital camera as in claim 1, wherein the user interface uses different manually operative interfaces for receiving image capture instruction and selecting the intended image instructions.

7. The digital camera as in claim 4 further comprising memory that automatically stores at least one image captured within the time lag period before time T as a candidate image.

8. The digital camera as in claim 1, wherein, when a photographing scene is changed, the memory stores at least one image captured within the time lag period before time T as a candidate image.

9. A method for setting a time lag period in a digital camera, the method comprising the steps of:
   (a) providing a user interface;
   (b) receiving an image capture instruction;
   (c) sequentially storing image data which are consecutively output from an image sensor from a time $T_1$ prior to the receipt of the image capture instruction until a time T of the image capture instruction;
   (d) displaying the stored image data between time T and $T_1$; wherein the user interface;
   (e) receiving instructions selecting an intended image captured at a time $T_2$ from the plurality of stored image data stored between time T and $T_1$
   (f) calculating a time lag period setting section between the time T to $T_2$ a time lag period;
   (g) registering the time lag period within the camera; and
   (h) automatically selecting for storage an image captured the time lag period before time T.

10. The method as in claim 9 further comprising the step of displaying thumbnail images.

11. The method as in claim 9 further comprising the step of providing different manually operative devices as the user interface.

12. The method as in claim 9, wherein time $T_2$ is different from time T.

13. The method as in claim 9 further comprising the step of providing time $T_2$ different from time $T_1$.

14. The method as in claim 9 further comprising the step of storing a plurality of images as candidate images.

15. The method as in claim 9 further comprising the step of providing different manually operative interfaces as the user interface for receiving image capture instruction and selecting the intended image instructions.

16. The method as in claim 9, wherein, when a photographing scene is changed, storing at least one image captured within the time lag period before time T as a candidate image in the memory.

\* \* \* \* \*